United States Patent
Oluyemi et al.

(10) Patent No.: US 12,067,425 B2
(45) Date of Patent: Aug. 20, 2024

(54) SYSTEM AND METHOD FOR PROVISIONING CLOUD COMPUTING RESOURCES

(71) Applicant: International Business Machines Corporation, Armonk, NY (US)

(72) Inventors: Oluwanifemi Oluyemi, Toronto (CA); Chuan Ran, Morrisville, NC (US); A. Jaylani Sharif, Ashburn, VA (US); Vamsee Movva, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 17/211,260

(22) Filed: Mar. 24, 2021

(65) Prior Publication Data
US 2022/0308929 A1 Sep. 29, 2022

(51) Int. Cl.
*G06F 9/50* (2006.01)
*G06F 9/445* (2018.01)
*G06F 16/51* (2019.01)
*G06F 16/54* (2019.01)
*G06F 16/583* (2019.01)

(52) U.S. Cl.
CPC ........ *G06F 9/5072* (2013.01); *G06F 9/44505* (2013.01); *G06F 16/51* (2019.01); *G06F 16/54* (2019.01); *G06F 16/5854* (2019.01)

(58) Field of Classification Search
CPC .... G06F 9/5072; G06F 9/44505; G06F 16/51; G06F 16/54; G06F 16/5854; G06F 9/5005
See application file for complete search history.

(56) References Cited

U.S. PATENT DOCUMENTS

| 9,147,125 B2 | 9/2015 | Wang et al. |
| 10,262,228 B2 | 4/2019 | Gujar et al. |

(Continued)

FOREIGN PATENT DOCUMENTS

| CN | 103106680 B | 5/2015 |
| CN | 103092698 B | 6/2017 |
| CN | 107426335 A | 12/2017 |

OTHER PUBLICATIONS

Nonymous, "A System to Segment, Classify and Understand Graphical Application Architectural Diagrams and automatically Orchestrate the Deployment," IPCOM000255806D,IP.com, Oct. 15, 2018,4 pages (Year: 2018).*

(Continued)

*Primary Examiner* — Cao H Nguyen
(74) *Attorney, Agent, or Firm* — Scully, Scott, Murphy & Presser, P.C.

(57) ABSTRACT

A computer-implemented system, method and computer program product for provisioning cloud computing resources that includes: converting a hand sketch representation of cloud computing resources to a digital image with metadata; generating a cloud deployment representation from the digital image with metadata; preparing cloud deployment manifest and configuration files from the cloud deployment representation; converting the cloud deployment manifest and configuration files into input data to be used to provision cloud computing resources; and transmitting the input data to a cloud computing vendor to provision the cloud computing resources.

14 Claims, 9 Drawing Sheets

(56) References Cited

U.S. PATENT DOCUMENTS

| | | | |
|---|---|---|---|
| 2014/0282545 A1* | 9/2014 | Richards | G06F 9/5072 718/1 |
| 2016/0179499 A1* | 6/2016 | Reeves | G06F 9/5027 717/172 |
| 2019/0205498 A1 | 7/2019 | Humphrey | |
| 2020/0081912 A1* | 3/2020 | Hong | G06F 16/583 |

OTHER PUBLICATIONS

Anonymous, "Visual Recognition for Architecting Complex Infrastructure," IPCOM000260167D, IP.com, Oct. 28, 2019, 5 pages.

Anonymous, "A System to Segment, Classify and Understand Graphical Application Architectural Diagrams and Automatically Orchestrate the Deployment," IPCOM000255806D, IP.com, Oct. 15, 2018, 3 pages.

Anonymous, "Method and System for Generating a Deployment Architecture Exploiting Input from Different Media Formats," IPCOM000255405D, IP.com, Sep. 25, 2018, 3 pages.

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

SYSTEM AND METHOD FOR PROVISIONING CLOUD COMPUTING RESOURCES

The present application relates generally to information handling and/or data processing systems, and more particularly to cloud computing and provisioning of cloud computing resources.

BACKGROUND

Cloud computing is becoming increasingly popular as more and more enterprises utilize varying degrees of cloud computing resources available from a number of vendors. A cloud computing environment is a scalable computer system or network that can be provisioned to create or mimic a desired hardware and software environment. One of the benefits of cloud computing environments is that they provide a scalable environment or an environment that can be created on demand. While cloud computing environments provide scalability and flexibility, cloud computing also adds a degree of complexity because the cloud computing environment must be provisioned to provide a desired environment prior to deploying applications. The cloud computing environment can provide a system of "computers" that can be provisioned to provide an environment with the desired hardware and software characteristics. A user of cloud computing resources often needs to specify the hardware, e.g., a set of specifications, for the cloud computing environment. For example, the user might have to specify CPU resources, memory, storage, the number of bits of the platform (e.g., 32 bit, 64 bit application platforms), I/O resources and other hardware information. The user might also have to specify software applications including, but not limited to, operating systems, database server applications, batch processing applications, web hosting applications, application servers, media servers, and other software.

There are several methods to deploy cloud computing resources including but not limited to web user interfaces (UIs), infrastructure-as-code, flow diagrams, vSphere, etc. Typically, the cloud is configured using an application program interface (API) provided by the cloud computing vendor. Deploying cloud computing resources is typically a planned operation process, where ideas have to be converted to detailed metadata which can be interpreted by a deployer, and used to provision resources based upon a pre-set method provided by the cloud computing provider, e.g., the cloud vender. One such cloud computing vendor is International Business Machines (IBM), which offers cloud computing resources and services on the IBM cloud. Other vendors that offer cloud computing resources and services include Amazon, Google, and Alibaba, although there are others.

There are often obstacles, problems, and wrinkles that impede the cloud provisioning and/or deployment process so that it does not proceed smoothly. For example, each cloud computing vendor has a different API to handle the cloud provisioning process that often requires the user to have in-depth technical skills to understand cloud orchestration tools and learn how to write configuration manifest files. In addition, cloud deployment preparation is time consuming as it requires a lot of time to translate the computing requirements to detailed architecture, and to also write the deployment manifest and/or configuration files.

SUMMARY

The summary of the disclosure is given to aid understanding of, and not with an intent to limit the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, the architectural structure, and/or method to achieve different effects. In this regard it will be appreciated that the disclosure presents and describes one or more inventions, and in aspects includes numerous inventions as defined by the claims.

A system, method and/or computer program product is disclosed for provisioning cloud resources according to one or more embodiments, including in an aspect provisioning cloud resources from free hand sketching. A computer-implemented method, system, and/or programming instructions for provisioning cloud computing resources in one or more embodiments includes: converting a hand sketch representation of cloud computing resources to a digital image with metadata; generating a cloud deployment representation from the digital image with metadata; preparing cloud deployment manifest and configuration files from the cloud deployment representation; converting the cloud deployment manifest and configuration files into input data to be used to provision cloud computing resources; and transmitting the input data to a cloud computing vendor to provision the cloud computing resources. In an aspect, the computer-implemented method, system, and/or programming instructions further includes storing the cloud deployment manifest files. In an aspect generating the cloud deployment representation comprises generating a digital structured diagram, wherein the digital structured diagram can include cloud deployment topology. Generating a cloud deployment representation from the digital image with metadata in an aspect can include determining whether the digital image matches a defined symbol in a symbol database.

The computer-implemented method, system, and/or programming instructions in an embodiment further comprises generating, in response to the digital image matching a defined symbol in a symbol database, the cloud deployment representation based upon the matching defined symbol in the symbol database. Preparing the cloud deployment manifest files and configuration files in an embodiment includes using cloud deployment manifest files and configuration files corresponding to the matching defined symbol. The computer-implemented method, system, and/or programming instructions, in response to the digital image not matching a defined symbol in the symbol database, in an aspect includes revising the hand sketch using machine learning. In one or more embodiments, the cloud provider API is used to provision the cloud computing resources. The computer-implemented method, system, and/or programming instructions also includes in an aspect associating hand sketches and specifications of cloud computing resources with symbols in the symbol database to create defined symbols.

In one or more embodiments a non-transitory computer readable medium comprises instructions that, when executed by at least one hardware processor, configure the at least one hardware processor to perform the operations as described herein. A computer-implemented system to provision cloud computing resources is provided in an embodiment that includes: a memory storage device storing program instructions; and a hardware processor having circuitry and logic to execute said program instructions to provision the cloud computing resources, the hardware processor coupled to said memory storage device and in response to executing said program instructions, is configured to: convert a hand sketch representation of cloud computing resources to a digital image with metadata; generate a cloud deployment representation from the digital image with metadata; prepare cloud deployment manifest and configuration files from the cloud deployment representation; convert the cloud deployment manifest and configuration files into input data to be used to provision cloud computing resources; and transmit the input data to a cloud computing vendor to provision the cloud computing resources.

The foregoing and other objects, features, and/or advantages of the invention will be apparent from the following more particular descriptions and exemplary embodiments of the invention as illustrated in the accompanying drawings wherein like reference numbers generally represent like parts of the illustrative embodiments of the invention.

BRIEF DESCRIPTION OF THE DRAWINGS

The various aspects, features, and/or embodiments of a system and/or method to provision cloud resources, and in an aspect provisioning cloud resources using free hand sketching, will be better understood when read in conjunction with the figures provided. Embodiments are provided in the figures for the purpose of illustrating aspects, features, and/or various embodiments of the systems and methods, but the claims should not be limited to the precise arrangement, structures, features, aspects, systems, modules, functional units, assemblies, subassemblies, circuitry, programming, embodiments, methods, processes, techniques, instructions, and/or devices shown, and the arrangements, structures, features, aspects, systems, modules, functional units, assemblies, subassemblies, circuitry, programming, embodiments, methods, processes, techniques, instructions, and/or devices shown may be used singularly or in combination with other arrangements, structures, assemblies, subassemblies, systems, modules, functional units, features, aspects, circuitry, programming, embodiments, methods, techniques, processes, instructions, and/or devices.

DETAILED DESCRIPTION

Figure 1:
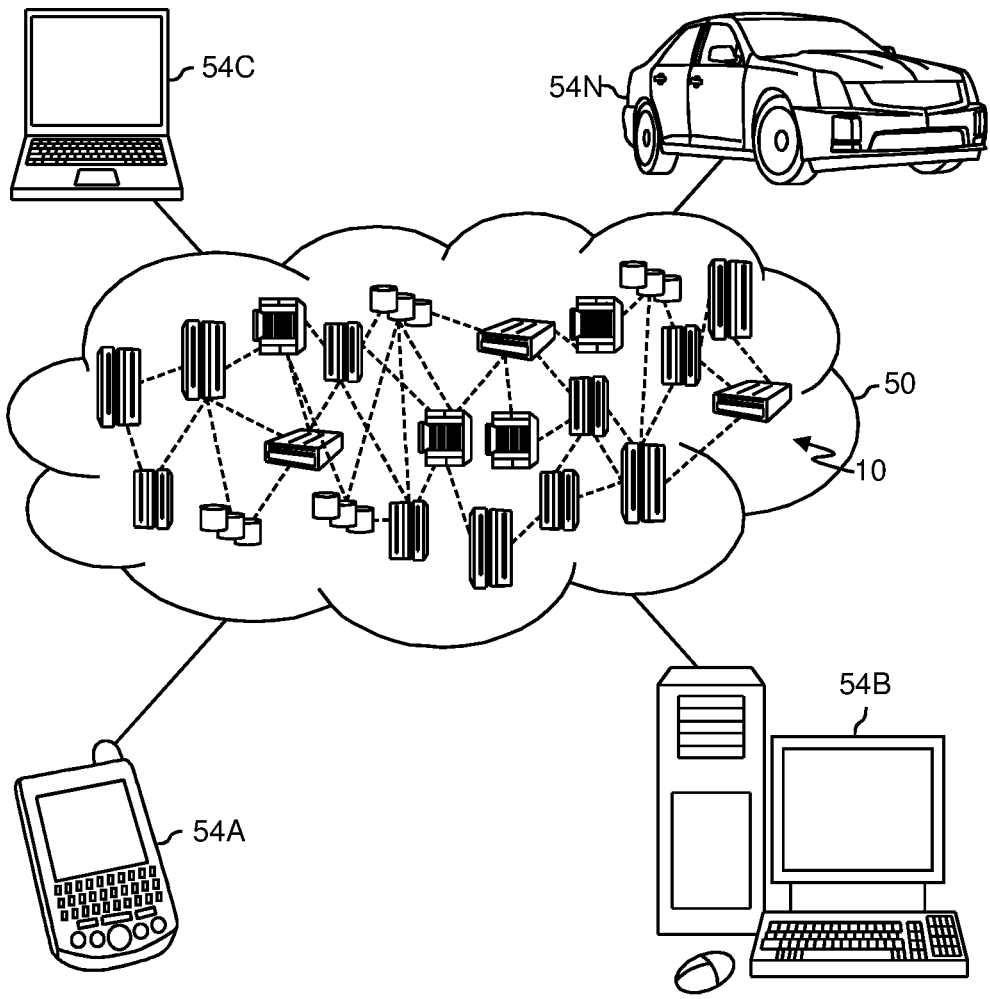
FIG. 1 depicts a cloud computing environment according to an embodiment of the disclosure.

The following description is made for illustrating the general principles of the invention and is not meant to limit the inventive concepts claimed herein. In the following detailed description, numerous details are set forth in order to provide an understanding of the system, method, and/or techniques of the invention for provisioning cloud computing resources, and in an aspect provisioning cloud computing resources from free hand sketches. It will be understood, however, by those skilled in the art that different and numerous embodiments of the system and/or method of the invention may be practiced without the specific details, and the claims and disclosure should not be limited to the arrangements, structures, systems, assemblies, subassemblies, devices, modules, functional units, circuitry, programming, embodiments, features, aspects, processes, methods, techniques, instructions, and/or details specifically described and shown herein. Further, particular features, aspects, arrangements, structures, systems, assemblies, subassemblies, devices, modules, functional units, circuitry, embodiments, programming, methods, processes, techniques, instructions, details, etc. described herein can be used in combination with other described features, aspects, arrangements, structures, systems, assemblies, subassemblies, devices, modules, functional units, circuitry, programming, embodiments, techniques, methods, processes, instructions, details, etc. in each of the various possible combinations and permutations.

It is assumed that those skilled in the art are familiar with cloud computing environments, including provisioning and allocating cloud computing resources. The following discussion omits or only briefly describes conventional features of information processing systems, data networks, and/or cloud computing environments, including provisioning of, allocating, and/or deploying cloud computing resources, which should be apparent to those skilled in the art. It may be noted that a numbered element is numbered according to the figure in which the element is introduced, and is typically referred to by that number throughout succeeding figures.

To simplify and ease the transition for customers, also referred to as deployers, to change to and/or use cloud computing resources, and/or updating cloud computing resources, it would be advantageous if users could provision cloud computing resources from paper and/or digital sketches, drawings, or diagrams. In other words, it would be advantageous if a customer could specify the cloud computing resources and specifications, e.g., the architecture, and/or topology of the desired system, by making a diagram or drawing. In this manner, users without an in-depth understanding on cloud infrastructure deployment tools could provision cloud computing resources without learning coding and configuring deployment manifest files and metadata.

In an aspect, a set of open-source symbols, diagrams, logos, and/or topology that can represent cloud resources, e.g., virtual machines (VMs), disk, CPU resources, memory, database, network, etc., can be defined. In an embodiment, the open-source symbols, diagrams, logos and/or topology that can represent cloud resources can be based upon, for example, IT industry standards. As different cloud computing providers have different cloud deployment configurations, in one or more embodiments, different cloud deployment manifest templates are defined/provided for different cloud providers (venders) as are different infrastructure as code (IaT) tools provided/defined. For example, the system and/or method provides cloud deployment manifest templates and infrastructure as code (IaC) tools that is available in the market, e.g., Terraform, CloudFormation, etc. In one or more embodiments, image processing, pattern recognition, and machine learning algorithms for conversion of free hand sketches/images/drawings to recognizable digital images (with metadata) are implemented. The digital images in an embodiment are then converted to cloud deployment patterns/topology, which are then converted to cloud deployment manifest and configuration files, and then cloud infrastructure resources are implemented, for example, by an orchestration tool, e.g., cloud vendor API.

Cloud computing is a model of service delivery for enabling convenient, on-demand network access to a shared pool of configurable computing resources (e.g., networks, network bandwidth, servers, processing, memory, storage, applications, virtual machines, and services) that can be provisioned and released through a service provider or vendor. This model can include one or more characteristics, one or more service models, and one or more deployment models. Characteristics can include, for example, on-demand service; broad network access; resource pooling; rapid elasticity; and/or measured service. Service models can include, for example, software as a Service (SaaS), Platform as a Service (PaaS), and/or Infrastructure as a Service (IaaS). Deployment models can include, for example, private cloud; community cloud; public cloud; and/or hybrid cloud.

A cloud computing environment is typically service oriented with a focus on statelessness, low coupling, modularity, and semantic interoperability. Typically at the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or mobile (smart) telephone 54A, desktop computer 54B, laptop computer 54C, and/or automobile computer system 54N may communicate. Nodes 10 may communicate with each other. They may be grouped (not shown) physically or virtually, in one or more networks, such as Private, Community, Public, or Hybrid clouds, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 1 are intended to be illustrative only and that computing nodes 10 and cloud computing environment 50 can communicate with any type of computerized device over any type of network and/or network addressable connection (e.g., using a web browser).

Figure 2:
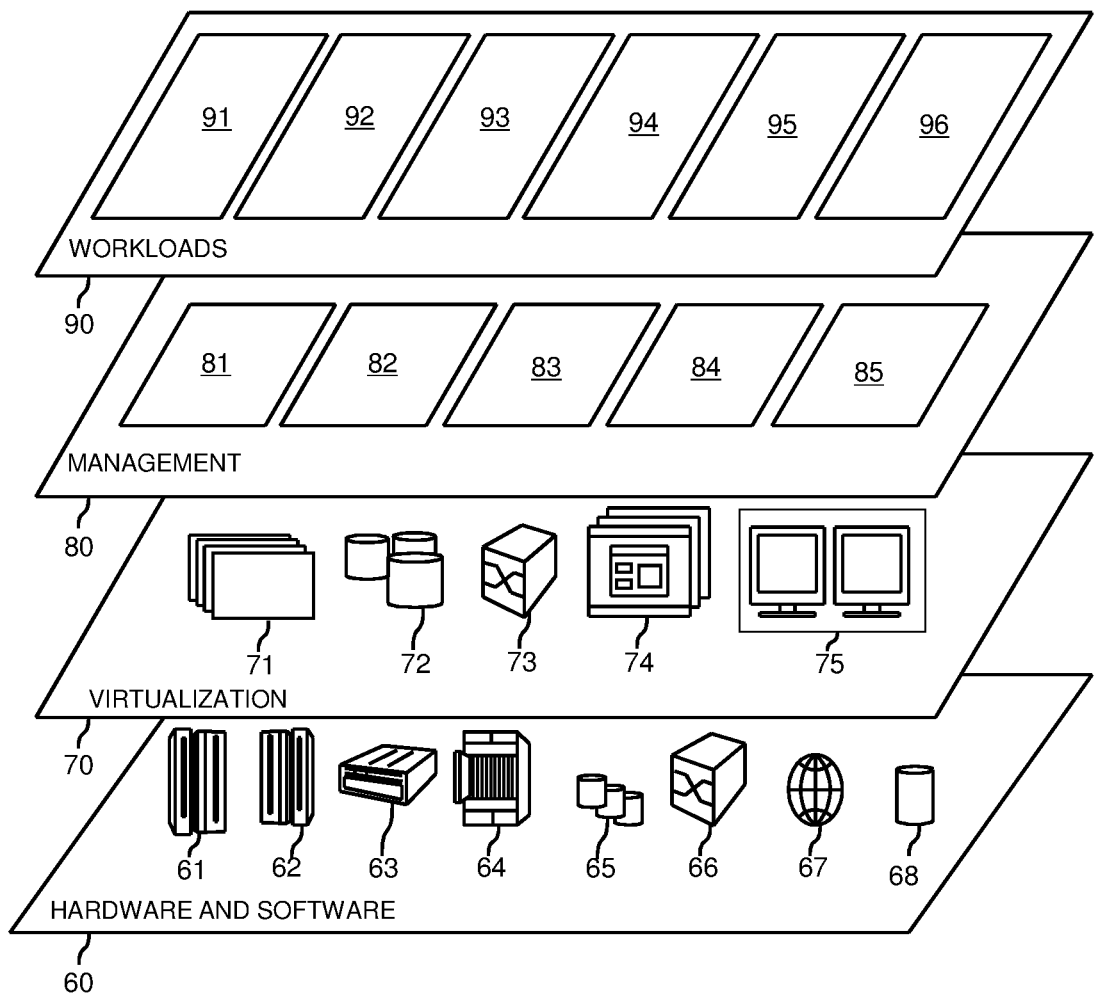
FIG. 2 depicts abstraction model layers of a cloud computing environment according to an embodiment of the disclosure.

Referring to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components can include: mainframes 61; RISC (Reduced Instruction Set Computer) architecture based servers 62; servers 63; blade servers 64; storage devices 65; and network and networking components 66. In some embodiments, software components include network application server software 67 and database software 68.

Virtualization layer 70 provides an abstraction layer from which the flowing examples of virtual entities may be provided: virtual servers 71; virtual storage 72; virtual networks 73, including virtual private networks; virtual applications and virtual operating systems 74; and virtual clients 75.

In one example, management layer 80 may provide the functions described below. Resource provisioning 81 provides procurement, preferably dynamic procurement, of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. Other functionality as illustrated by workload layer 96 is contemplated.

Figure 3:
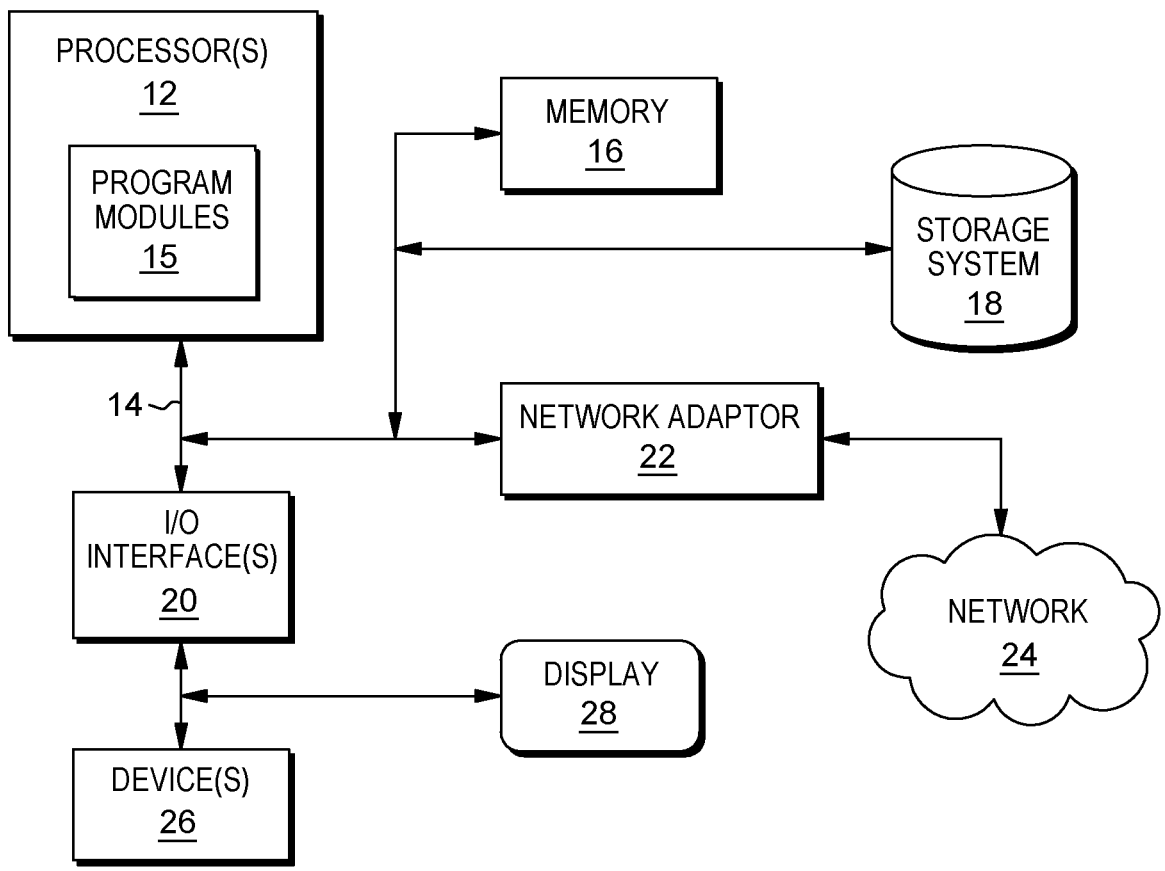
FIG. 3 illustrates an exemplary computer system in accordance with the present disclosure to provision cloud computing resources and in an aspect provision cloud computing resources from free hand sketches.

FIG. 3 illustrates an example computing system 25 in accordance with the present disclosure that can be used to provision cloud computing resources. It is to be understood that the computer system depicted is only one example of a suitable electronic computer system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 3 may include, but are not limited to, mainframe computer systems, server computer systems, thin clients, thick clients, personal computer systems, network PCs, minicomputer systems, handheld or laptop devices, tablets, smart phones, multiprocessor systems, microprocessor-based systems, set top boxes, programmable consumer electronics, and distributed cloud computing environments that include any of the above systems or devices, and the like.

In some embodiments, the computer system 25 may be described in the general context of computer system executable instructions, embodied as program modules or software programs stored in memory 16, being executed by the computer system. Generally, program modules may include routines, programs, objects, components, logic, data structures, and so on that perform particular tasks and/or implement particular input data and/or data types in accordance with the present invention.

The components of the computer system 25 may include, but are not limited to, one or more processors or processing units 12, a memory 16, and a bus 14 that operably couples various system components, including memory 16 to processor 12. In some embodiments, the processor 12 may execute one or more program modules 15 that are loaded from memory 16, where the program module(s) embody software (program instructions) that cause the processor to perform one or more method embodiments of the present invention. In some embodiments, program module 15, e.g., software programs, may be programmed into the circuits of the processor 12, loaded from memory 16, storage device 18, network 24 and/or combinations thereof. It is generally appreciated that processor 12 contains circuits including integrated circuits to perform operations of the processor 12.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system 25 may include a variety of computer system readable media. Such media may be any available media that is accessible by the computer system, and it may include both volatile and non-volatile media, removable and non-removable media. Memory 16 (sometimes referred to as system memory) can include computer readable media in the form of volatile memory, such as random access memory (RAM), cache memory and/or other forms. Computer system 25 can further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system 25 can also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system 25 can communicate with one or more networks 24 such as a local area network (LAN), a general wide area network (WAN), and/or a public network (e.g., the Internet) via network adapter 22. In the present disclosure, one or more of the networks 24 with which computer system 25 would communicate would be the cloud computing provider or vendor. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

Figure 4:
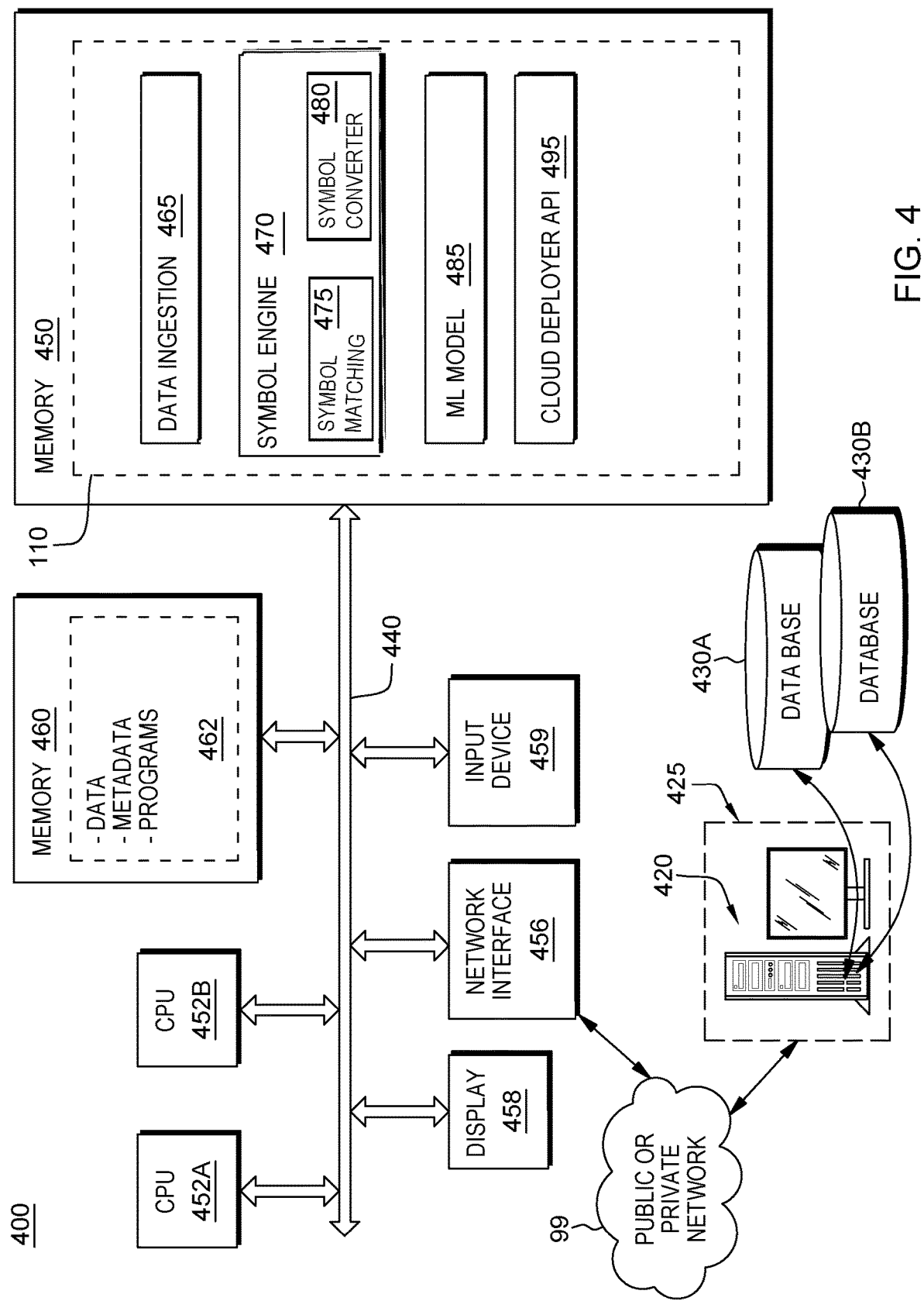
FIG. 4 schematically depicts an exemplary computer system/computing device which is applicable to implement one or more embodiments of the present disclosure to provision cloud computing resources, and in an aspect provision cloud computing resources using free hand sketches.

FIG. 4 illustrates a computer system 400 configured and programmed for use in provisioning cloud computing resources, for example, provisioning cloud computing resources from free hand sketches. In one or more embodiments, such a system tool 400 may be employed by or for an enterprise, company, and/or other entity that desires to utilize and/or allocate computing resources from a cloud computing provider or vendor, for example International Business Machine (IBM) cloud computing services. In one or more aspects, computing system 400 may include, for example, mainframe computers, servers, distributed cloud computing environments, thin clients, thick clients, personal computer (PC) networks, personal computers, laptops, tablets, mini-computers, multi-processor based systems, microprocessor based systems, smart devices, smart phones, set-top boxes, programmable electronics, or any other similar computing device, an embodiment of which is described in more detail in FIG. 3.

Computing system 400 includes one or more hardware processors 452A, 452B (also referred to as central processing units (CPUs)); a memory 450, e.g., for storing an operating system (OS), application program interfaces (APIs), and program modules/instructions; a network interface 456; a display device 458; an input device 459; and can include any other features common or uncommon to a computing device. In some aspects, computing system 400 may, for example, be any computing device that is configured to communicate with a cloud computing environment 425, e.g., a cloud computing vendor, including web-based or cloud-based servers 420 over a public or private communications network 99. Cloud computing environment 425 may include one or more databases 430A & 430B. While FIG. 4 shows a single server or computer device 420, it can be appreciated that cloud computing environment 425 can include numerous and vast computing resources. The disclosure is not limited in the type of cloud computing environment 425, the cloud computing vendor, or the amount or type of cloud computing resources available by or through cloud computing environment 425 and/or cloud computing vendor. Not shown in FIG. 4 in connection with cloud computing environment 425 is a cloud provider application program interface (API) which will be discussed in greater detail in connection with FIG. 5.

In the embodiment depicted in FIG. 4, processors 452A, 452B may include, for example, a microcontroller, Field Programmable Gate Array (FPGA), or any other processor that is configured to perform various operations. Communication channels 440, e.g., wired connections such as data bus lines, address bus lines, Input/Output (I/O) data lines, video bus, expansion busses, etc., are shown for routing signals between the various components of system 400. Processors 452A, 452B are configured to execute instructions as described below. These instructions may be stored, for example, as programmed modules in an associated memory storage device 450.

Memory 450 may include, for example, non-transitory computer readable media in the form of volatile memory, such as random access memory (RAM) and/or cache memory or others. Memory 450 may include, for example, other removable/non-removable, volatile/non-volatile storage media. By way of non-limiting examples only, memory 450 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 456 is configured to transmit and receive data or information to and from cloud computing environment 425, e.g., a cloud computing resource, via wired or wireless connections. For example, network interface 456 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 400 to transmit information to or receive information from the cloud computing environment 425.

Display 458 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 458 may include a liquid crystal display (LCD), an e-paper/e-ink display, an organic LED (OLED) display, or other similar display technologies. In some aspects, display 458 may be touch-sensitive and may also function as an input device.

Input device 459 may include, for example, a keyboard, a mouse, a touch-sensitive display, a keypad, a microphone, or other similar input devices or any other input devices that may be used alone or together to provide a user with the capability to interact with the computing device 400.

Further, as shown as part of system 400, there is provided a local memory and/or an attached memory storage device 460, or a remote memory storage device, e.g., a database, accessible via a remote network connection for input to the system 400. The local or remote memory 460 may be configured for storing information 462, e.g., data, metadata, programs, etc.

Memory 450 of computer system 400, in one or more embodiments, stores one or more processing modules that include, for example, programmed instructions adapted to facilitate and/or assist with provisioning, allocating and/or deploying cloud computing resources. In one embodiment, one of the programmed processing modules stored at the associated memory 450 includes a data ingestion module 465 that provide instructions and logic for operating circuitry to access/read data for use by other modules.

In an embodiment, a Symbol Engine Module 470 is included in the system 400, e.g., in memory 450, and provides instructions and logic for operating circuitry to facilitate, assist with, and/or contribute to the provisioning, allocating, and/or deploying of cloud computing resources, from for example a cloud computing provider. In an aspect, Symbol Engine Module 470, and in an embodiment Symbol Matching Module 475 employs instructions and logic for operating circuitry to recognize symbols, diagrams, logos and/or topology from, for example, free hand sketches (and/or other written, textual descriptions). In a further aspect, Symbol Engine Module 470, and in an embodiment Symbol Converter Module 480, employ instructions and logic to operate circuitry to convert, translate, and/or generate a structured digital diagram with metadata from sketches and the like. Symbol Converter Module 480 works in conjunction with Symbol Matching Module 475, and both are described in more detail in connection with FIGS. 5 & 7, as well as the flow charts of FIGS. 8-10.

In one or more embodiments, Symbol Engine Module 470 leverages cognitive capabilities. A cognitive system (sometimes referred to as deep learning, deep thought, or deep question answering) is a form of artificial intelligence that uses machine learning and problem solving. A modern implementation of artificial intelligence (AI) is the IBM Watson cognitive technology. Models for scoring and ranking an answer can be trained on the basis of large sets of input data. The more algorithms that find the same answer independently, the more likely that answer is correct, resulting in an overall score or confidence level. Cognitive systems are generally known in the art. In an aspect, Symbol Engine Module 470 leverages cognitive capabilities by including machine learning (ML) models. The machine learning model module and machine learning algorithm can be part of the Symbol Engine Module 470, for example as part of Symbol Matching Module 475, or in an aspect machine learning modules and algorithms can be part of a separate ML model module 485 within Memory 450 as shown in FIG. 4.

Memory 450 optionally includes a supervisory program having instructions for configuring the computing system 400 to call one or more of the program modules and invoke the operations of system 400. In an embodiment, such supervisory program calls methods and provides application program interfaces (APIs) for running the Symbol Engine Module 470, including the various machine learning (ML) models for detecting and recognizing free hand sketches, images, and/or drawings, and converting such free hand sketches to structured digital representations. In an embodiment, at least one cloud deployer application program interface (API) 495 is invoked in an embodiment to leverage REST API from cloud providers. REST stands for representational state transfer and a REST API, also known as RESTful API is an application program interface (API or web API) that conforms to the constraints of REST architectural style and allows for interaction with RESTful web services.

Figure 5:
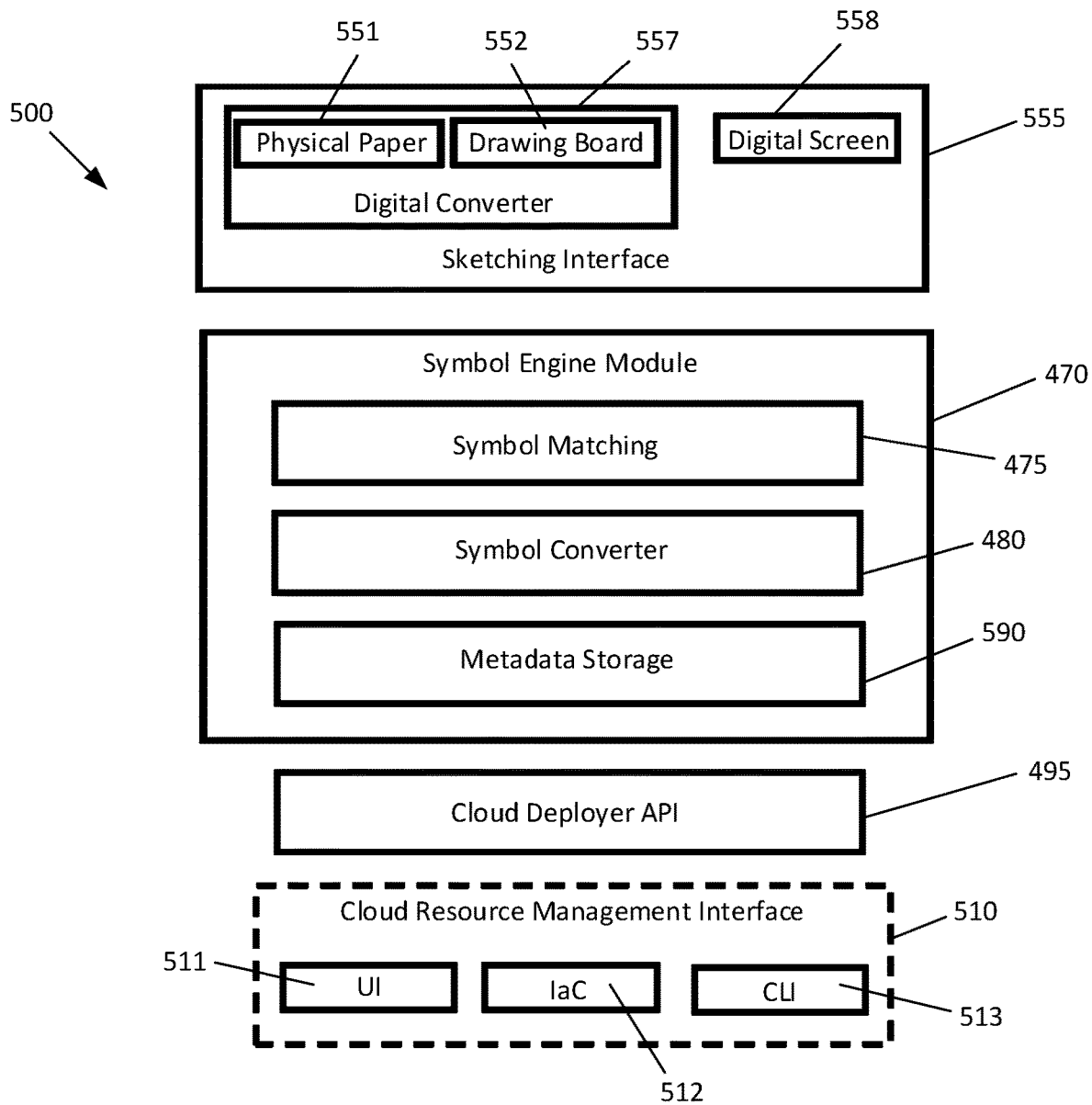
FIG. 5 schematically illustrates an embodiment of an overview block diagram of a system to implement one or more embodiments of the present disclosure to provision cloud computing resources.

FIG. 5 illustrates an overview of an embodiment of Cloud Provisioning System 500 which in an aspect includes Symbol Engine Module 470, and Cloud Deployer API 495 of FIG. 4. Also shown is Sketching Interface Module 555 which employs instructions and logic for operating circuitry to receive the hand drawn sketch or drawing and convert the hand drawn sketch to digital image with metadata, as discussed in more detail below. Cloud Resource Management Interface 510 of the cloud computing provider, e.g., the cloud computing vendor, is also shown in FIG. 5.

In an aspect, Sketching Interface Module 555 receives a hand drawn sketch, diagram, and/or drawing representing for example the cloud computing resources and/or topology desired and/or specified by a user. The user in an embodiment can use diagrams, text, and/or numbers to describe and/or specify the specifications, e.g., the desired cloud computing resources. For example, the user might have to specify CPU resources, memory, storage, the number of bits of the platform (e.g., 32 bit, 64 bit application platforms), number of virtual machines/clients, specifications for the virtual machines, I/O resources and other hardware information. The user might also have to specify software applications including, but not limited to, operating systems, database server applications, batch processing applications, web hosting applications, application servers, media servers, and other software. The hand drawn sketch, image, diagram, and/or drawing can be provided on physical paper 551, drawing board 552, and/or any other medium, e.g., a digital whiteboard. In an aspect, the diagram and written specifications can be drawn or sketched on digital screen 558.

Figure 6:
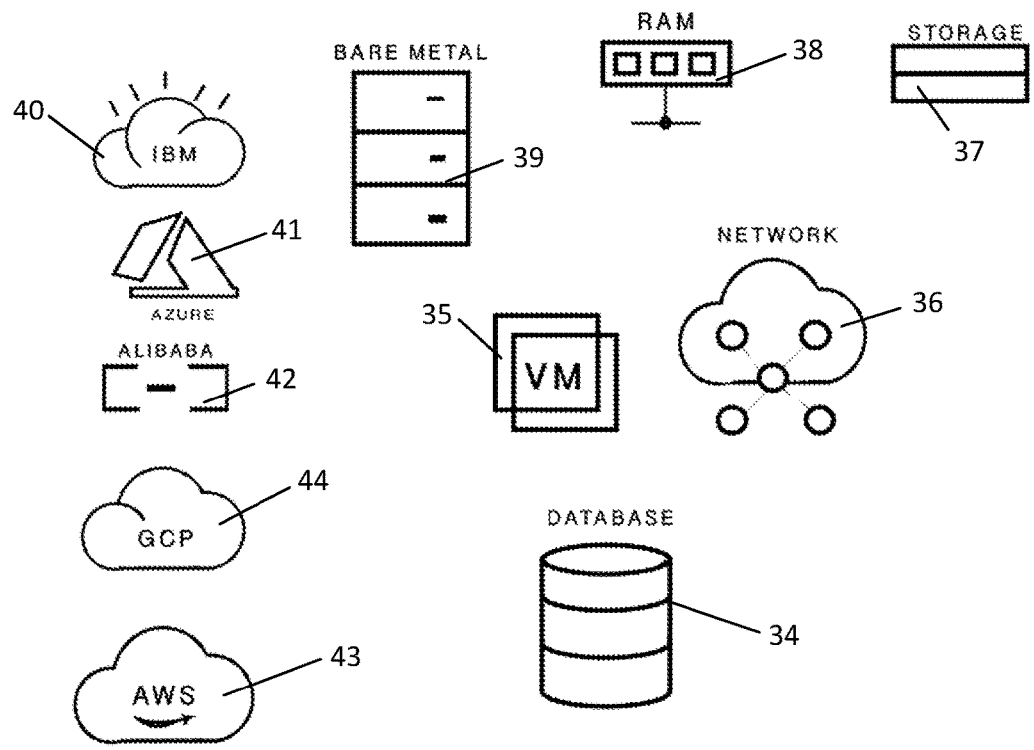
FIG. 6 diagrammatically illustrates example symbols, diagrams, and/or logos that can be utilized to represent different aspects, resources, and/or vendors of cloud computing resources.

In terms of the diagram created by a deployer, e.g., the hand drawn diagram or free-hand sketch, indicating, identifying, and/or specifying the cloud computing resources and specifications desired and/or needed by the deployer, preferably relies upon symbols, diagrams, logos, and/or topology to represent cloud computing resources and/or vendors. In one or more embodiments, the symbols, diagrams, topology, and/or logos representing cloud computing resources or cloud computing vendors are based upon IT industry standards. For example, standards as illustrated in FIG. 6 can be used to represent various computing resources, topology, architecture, and/or vendors such as, for example, databases, storage, RAM, virtual machines, network, etc. As shown in FIG. 6, FIG. 34 can be drawn to represent a database, FIG. 35 can be drawn to represent virtual machines, FIG. 36 can be drawn to represent a network, FIG. 37 can be drawn to represent storage, FIG. 38 can be drawn to represent RAM, and FIG. 39 can be drawn to represent bare metal. Other IT standard figures can be used to define and represent cloud computing resources. Symbols and/or logos can also be used to represent cloud computing vendors, and in particular cloud deployment manifest templates for different cloud providers and different infrastructure as code tools. For example, FIG. 40 can be drawn to represent the IBM cloud, FIG. 41 can be drawn to represent Azure, FIG. 42 can be drawn to represent Alibaba, FIG. 43 can be drawn to represent Amazon web services, and FIG. 44 can be drawn to represent Google Cloud Platform (GCP). Other figures, e.g., symbols and logos, can be used to represent and define other cloud computing vendors.

In one or more embodiments, Sketching Interface Module 555 includes and/or calls up a digital converter 557 that converts the hand drawn sketch and/or specifications into a digital image, preferably with metadata. The digital converter 557 can be, for example, a camera, a scanner, a digital whiteboard, and/or any other technology or device that can convert drawings, text, and/or numbers into a digital image, preferably with metadata. The digital converter 557 of Sketching Interface Module 555 converts the image, text, and/or numbers representing the cloud computing specifications into a computer readable input (preferably with metadata). In one or more aspects the digital screen 558 can be used to display the digital image after conversion. A deployer in an embodiment can review the digital image on the screen and determine whether the hand drawn specification and written specifications have been properly converted into an appropriate digital image, e.g., whether the digital image is an accurate representation of the hand sketch/diagram and written specification. In one or more embodiments, the digitized image, preferably with metadata, is received by the Symbol Engine Module 470. The metadata for example provides information and details on the digital image, such as for example, the resolution, size, blob (bytes), format, tags, date, device type, etc.

Symbol Engine Module 470 as shown in FIG. 5, in one or more embodiments includes Symbol Matching Module 475, Symbol Converter Module 480, and Metadata Storage 590. Symbol Matching Module 475 includes instructions and logic for operating circuitry to compare the digitized image of the hand drawn sketch and/or written specifications to a set of pre-defined open-source symbols, diagrams and topology that represents cloud computing resources preferably based upon IT standards. The Symbol Matching Module 475, also referred to as the Symbol Matcher 475 permits validation on the digital image, e.g., to determine if the symbol drawn exists in the Symbol database (has been defined in the Symbol database). Symbol Converter Module 480 includes instructions and logic for operating circuitry to convert the digital image to a structured digitized diagram (representation), preferably in an aspect with metadata. The Symbol Converter Module 480 in an embodiment permits validation of the digitally converted diagram, e.g., the structured digitized representation. A block diagram of Symbol Engine Module 470 is shown in more detail in FIG. 7 including showing a more detailed block diagram of Symbol Matching Module 475 and Symbol Converter Module 480. The Symbol Engine Module 470 leverages a set of image processing, pattern recognition, and machine learning algorithms to convert the free hand sketch to a recognizable digital image (with metadata), which is then used to generate cloud deployment patterns and topology, which is then used to generate cloud deployment manifest and configuration files. Metadata, e.g., the manifest files, is stored in Metadata Storage 590.

Cloud Provisioning System 500 includes cloud deployer API 495, described in connection with FIG. 4. Also shown as part of Cloud Provisioning System 500 is Cloud Resources Management Interface 510. Cloud Resources Management Interface 510 is an extension of the cloud service provider, e.g., an extension of cloud computing environment 425 in FIG. 4, and in an embodiment can a separate module 425 connected to cloud computing environment 425, similar to how database 430A & 430B are connected to cloud computing environment 425. Cloud Resources Management Interface 510 in one or more embodiments includes a User Interface (UI) 511, Infrastructure as Code (IaC) 512, and/or Command Line Interface 513.

Figure 7:
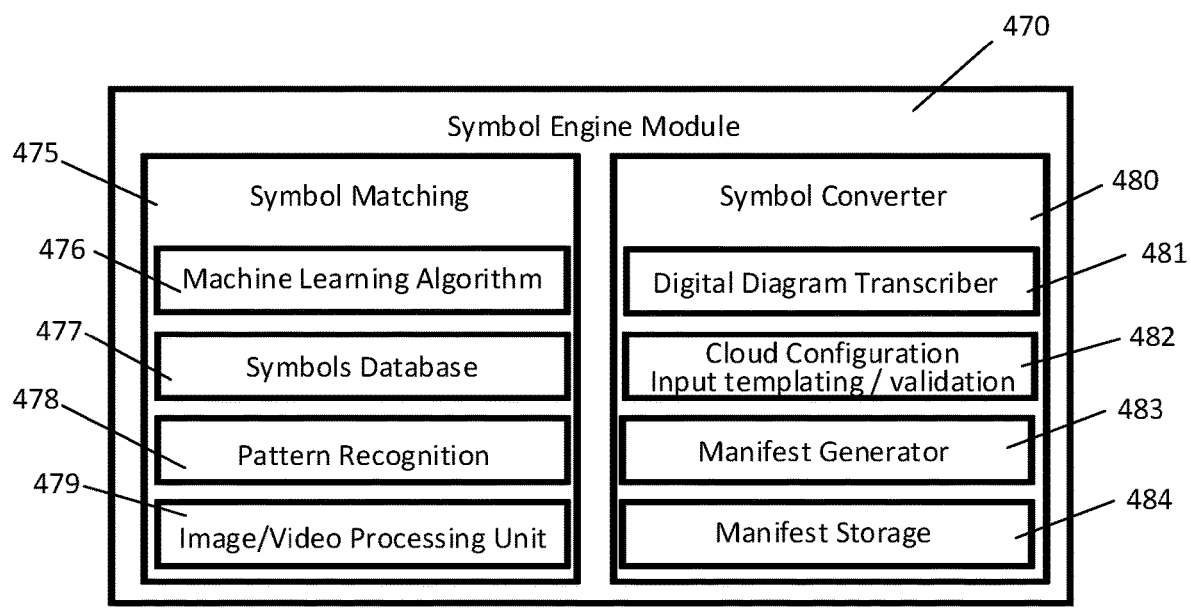
FIG. 7 diagrammatically illustrates a block diagram of the symbol engine module of FIG. 5.

As shown in FIG. 7, Symbol Matching Module 475 includes Symbols Database 477 that has a repository of predefined symbols used in the system and/or method for comparing against the digitized image of the hand drawn diagram and written specification. Symbol Matching Module 475 further includes machine learning algorithm module 476 and pattern recognition module 478. Pattern recognition module 478 is used to identify and match the digital image with the symbols in the symbols database 477. Machine learning algorithms from machine learning algorithm module 476 enhances the ability to match the digital images of the hand drawn sketch to the symbols in the symbol database 477. Symbol Matching Module 475 further includes Image/Video processing unit 479 to convert a physically drawn image into a digital image. The Image/Video processing unit 479 in an embodiment includes a device, e.g., a camera, scanner, to convert the physically drawn image to a digital image. The Image/Video processing unit 479 can also accept the image as input and performs further processing and cleaning up the digital image.

As shown in FIG. 7, Symbol Converter Module 480 includes a Digital Diagram Transcriber 481 that converts the digital image matched to a Symbol from Symbols Database 477 and to a digital structure representation. In an embodiment, the Symbols Database 477 has associated with the predefined symbols a corresponding, mapped digital structure diagram or representation. In response to a match between the digitized image and one or more of the symbols in the symbols database, the Digital Diagram Transcriber 481 provides a digital structure representation illustrating the deployment patterns and topology for the cloud computing resources being specified. Symbol converter Module 480 further includes in an embodiment Cloud Configuration Input Templating/Validation Module 482 which provides all supported cloud provider templates, and all supported cloud resources supported by the cloud provider in the Symbol Engine Module. The templates are used to specify a blueprint of acceptable properties used to deploy a cloud resource to a cloud provider environment. Each property includes parameters and accepted format for input, where format includes string, byte, integer, etc. Validation indicates whether the converted diagram's manifest from the Manifest Generator 483 complies with the template for the designated cloud computing vendor.

Symbol Converter Module 480 further includes in an embodiment, a Manifest Generator 483 for generating the cloud deployment manifest/configuration files, and a Manifest Storage 484 for storing the cloud deployment manifest/configuration files. In one or more embodiments, the Digital Diagram Transcriber 481 transcribes the digital images to generate the cloud deployment patterns/topology, which is provided to and/or used by the Manifest Generator 483 to generate corresponding cloud deployment manifest and configuration files. The functions and operations of the Symbol Engine Module 470, the Symbol Matching Module 475, and the Symbol Converter Module 480 will become more apparent in connection with the flow charts of FIGS. 8-10.

Figure 8:
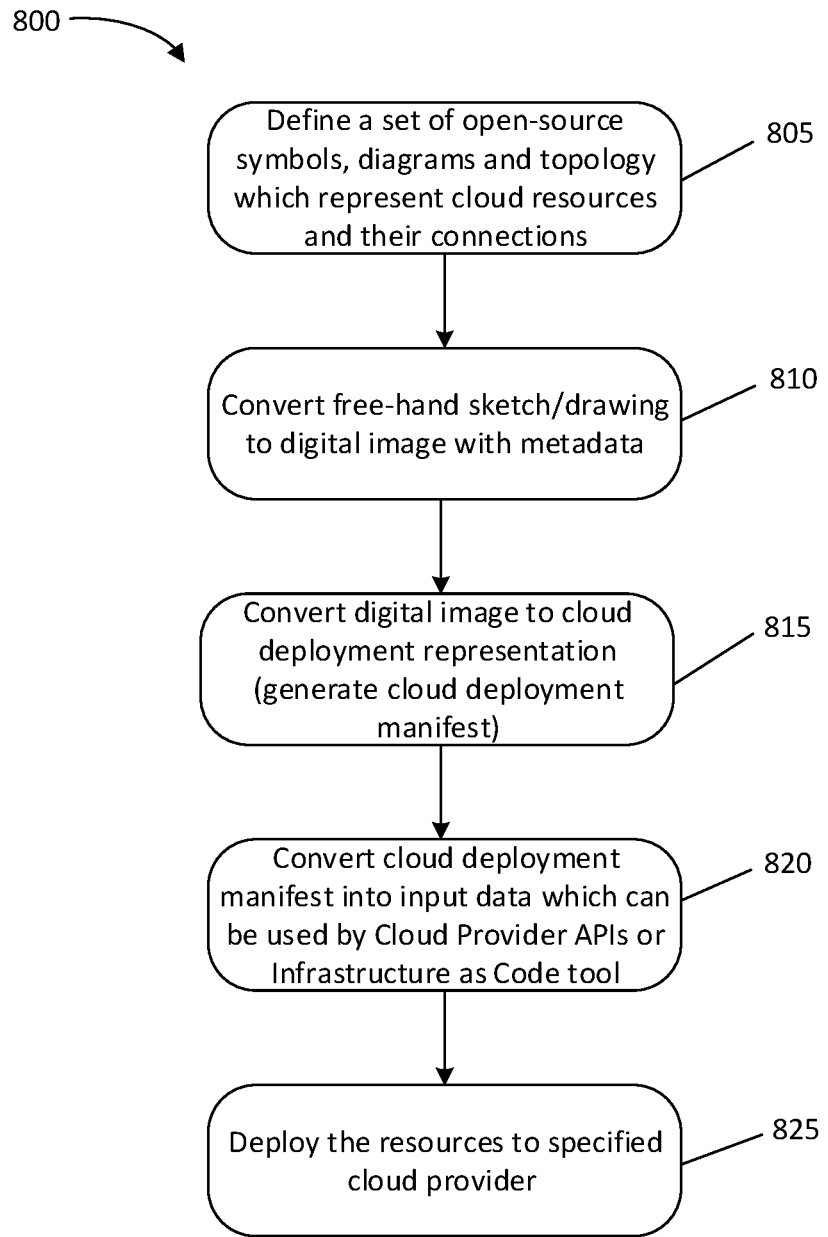
FIG. 8 illustrates a diagrammatic flowchart of a method according to an embodiment of the present disclosure of provisioning cloud computing resources.

FIG. 8 is an exemplary flowchart in accordance with an embodiment illustrating and describing a method 800 of provisioning a cloud computing environment, e.g., cloud computing resources provided by a cloud computing vendor, including provisioning a cloud computing environment using free hand sketches, drawings, or diagrams. While the method 800 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 8, but the process may be integrated and/or one or more steps may be performed together, simultaneously, or the steps may be performed in the order disclosed or in an alternate order.

Figure 10:
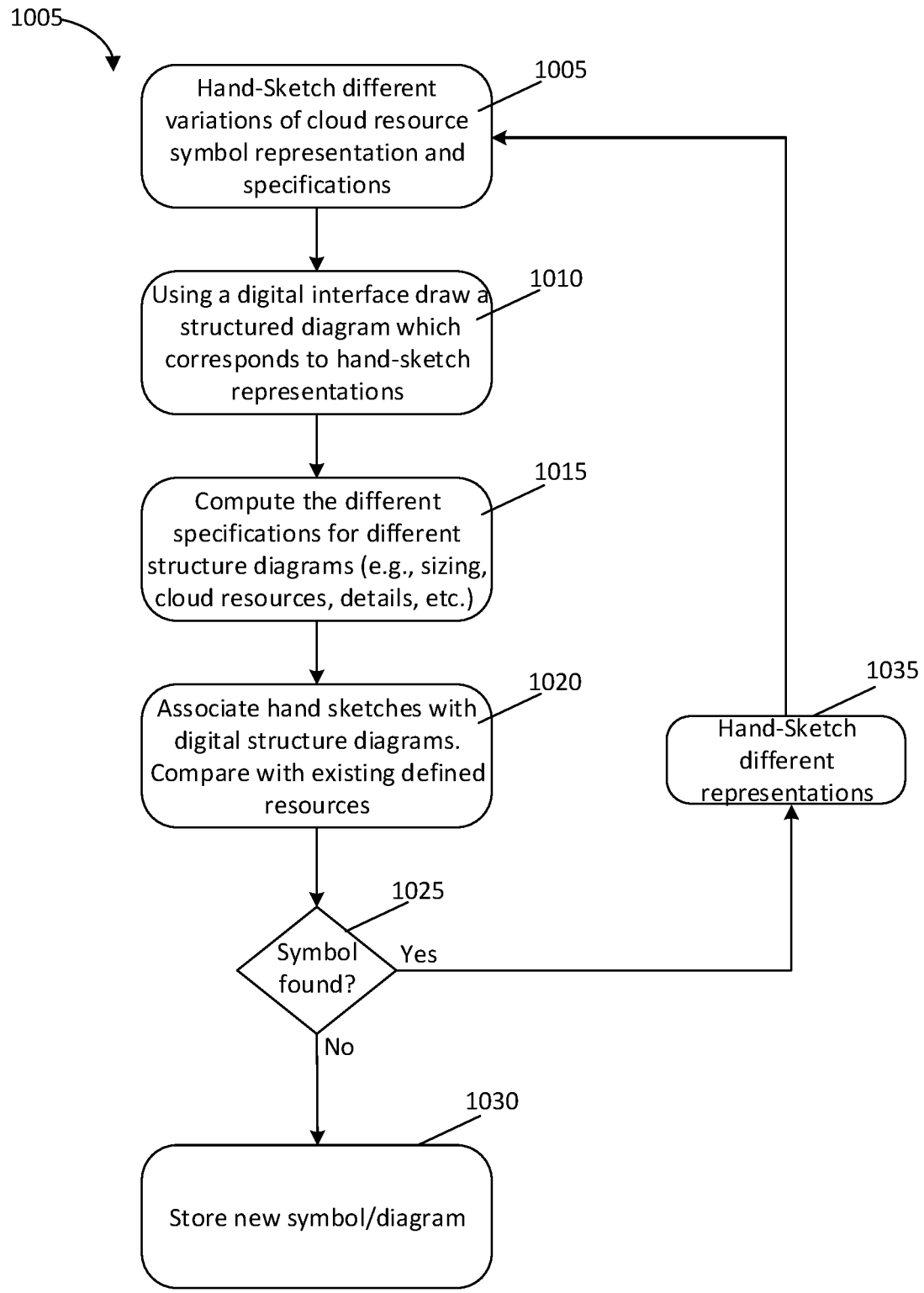
FIG. 10 illustrates a diagrammatic flowchart of a method according to an embodiment of the present disclosure of defining symbols for use in a system and/or method of provisioning cloud computing resources.

In one or more aspects, the method 800 includes at 805 defining a set of open source symbols, diagrams, logos, and/or topology that can represent cloud computing resources and their connections. In an embodiment, the open-source symbols, diagrams, logos and/or topology can be defined based upon IT standards. FIG. 10 describes in more detail defining open-source symbols, diagrams, logos, and topology to represent cloud computing resources, and storing the symbols, diagrams, logos, and/or topology and associated, correlated, mapped information.

At 810 a free hand sketch or drawing, and in an optional aspect written text of the specifications, intended to represent the cloud computing resources to be provisioned is received by the cloud provisioning system, e.g., the Cloud Provisioning System 500. In an embodiment, the free hand sketch, drawing, and/or diagram sets forth the topology and/or architecture of the cloud computing resources, and in an aspect can optionally include written text describing the specified cloud computing resources. In an embodiment, the hand sketch, drawing, and/or diagram, and optional written text of the specifications, is received by a sketching interface module, e.g., Sketching Interface Module 555. The hand sketch, drawing, and/or diagram, and optional written text of the specifications, in an embodiment is converted into a digital image with the associated metadata at 810.

In an aspect, existing image and video processing technologies can be used to convert the free-hand sketch/drawing to a digital image preferably with metadata at 810. For example, a digital camera can convert the free-hand diagram or sketch into a digital image with metadata. A whiteboard or drawing board; a scanner, e.g., an optical scanner; or other technologies, now known or yet to be developed, can be used to convert the free-hand diagram, sketch, or drawing into digital data, e.g., a digital image, including the metadata. A digital converter, e.g., digital converter 557, in a sketching interface, e.g., Sketching Interface Module 555, can be used to convert the hand sketch, drawing, and/or diagram into a digital image preferably with metadata. In an embodiment, the deployer can hand sketch the system diagram, topology, and/or architecture, including text specifications, directly onto a digital board that automatically converts the drawing to a digital image, preferably with metadata.

Figure 9:
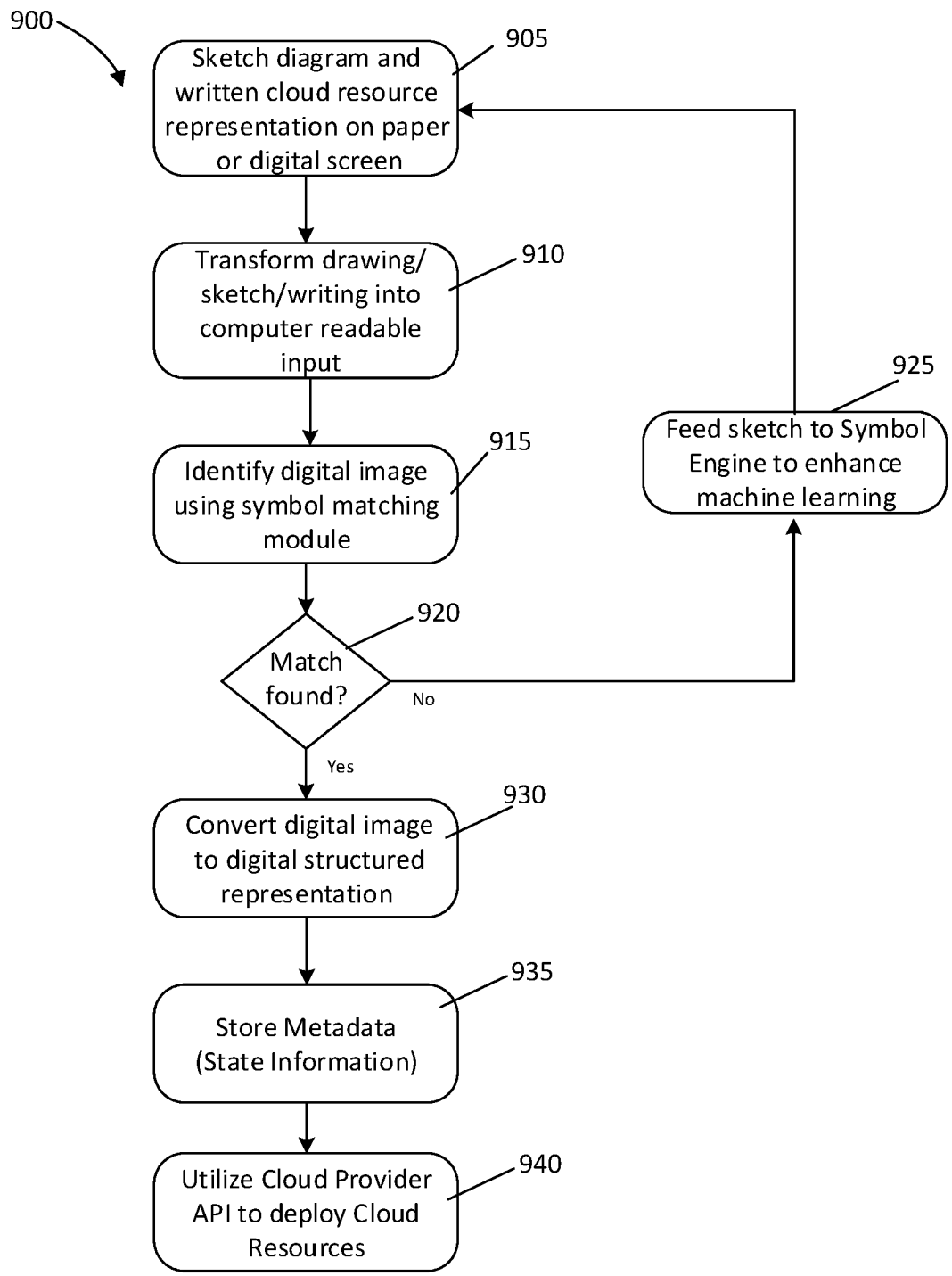
FIG. 9 illustrates a diagrammatic flowchart of a method according to another embodiment of the present disclosure of provisioning cloud computing resources.

At 815 the digital image is converted to a cloud deployment representation. In one or more embodiments, pattern recognition and machine learning algorithms are used to facilitate and convert the digital image to a cloud deployment representation. Image and video processing in an embodiment is used to process the digital image to facilitate converting the digital image to a cloud deployment representation. In an embodiment, based upon the predefined cloud resources data, pattern recognition and machine learning algorithms are leveraged to convert the digital image into a cloud deployment pattern and topology that is agnostic to the cloud provider. In an embodiment, the digital image is converted to a cloud deployment representation in for example a symbol engine module, e.g., Symbol Engine Module 470. In an aspect, the system interactively presents options to the customer to deploy to any cloud provider of choice. In an embodiment, interactively presenting options can include, for example, matching the diagram (e.g., the digital image) with existing best practice patterns and provide several similar deployments for comparison. In the event there is no match of the digital image and metadata to an existing deployment model, the customer deployment model is feed to the learning knowledge database as shown in more detail in FIG. 9. FIG. 9 shows the process of 815 in more detail.

In one or more embodiments, converting the digital image to cloud deployment representation at 815 includes generating manifest and configuration files. In an aspect, the specifications for the cloud computing resources to be provisioned will be generated, including identifying, for example, virtual machines, databases, including quantities, specifications, and/or relationships. In an aspect, the cloud deployment representation includes cloud deployment patterns and topology and the cloud deployment patterns and topology are translated into cloud manifest and configuration files. At 815 the digital image in one or more embodiments is converted to cloud deployment pattern, topology, and/or other representations, and the cloud deployment pattern, topology, and/or representations in one or more aspects is translated into cloud deployment manifest and configuration files.

At 820 the cloud deployment manifest/configuration files are converted into input data which can be used by cloud provider APIs, or cloud provider Infrastructure as Code tools. In an embodiment, at 820, existing cloud deployment manifest templates are leveraged to convert the cloud deployment configuration/manifest files into input data that can be recognized by the specified, desired cloud computing provider/vendor. That is at 820, existing cloud deployment manifest templates are leveraged to convert the cloud deployment pattern, topology, and/or representation into manifest/configuration files that can be recognized for provisioning by the infrastructure as code tool (e.g., terraform) of the specified, desired cloud computing vendor. In an aspect, the cloud computing provider requires input before creating the cloud resource(s). The input data at 820 is the format for cloud resource properties accepted by the cloud provider, which in an embodiment is created with the Cloud Configuration Input Templating 482 in the Symbol Converter Module 480.

At 825 the specified cloud computing resources are deployed to the specified, desired cloud computing provider. In an aspect, 825 can include outputting the generated deployment configuration/manifest files for final review and approval, and if approved launch the provisioning of the specified cloud computing resources. In an embodiment, the outputting of the generated deployment configuration/manifest files can be interactively performed.

FIG. 9 is an exemplary flowchart in accordance with another embodiment illustrating and describing a method 900 of provisioning a cloud computing environment, e.g., cloud computing resources provided by a cloud computing vendor, including provisioning a cloud computing environment using free hand sketches, drawings, or diagrams. While the method 900 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 9, but the process may be integrated and/or one or more steps may be performed together, simultaneously, or the steps may be performed in the order disclosed or in an alternate order.

At 905, a deployer draws a hand-sketch and/or written cloud computing resources representation on physical paper, surface, or digital screen. The sketch in an embodiment will use symbols and/or logos to represent the cloud computing topology, architecture, and specifications, e.g., storage requirements, number of virtual machines, performance specifications such as CPU resources, etc. The physical drawing/sketch/writing is transformed at 910 into computer readable input using a digital converter. That is, at 910, the drawing, sketch, diagram, and/or written specification, which in an embodiment uses symbols, is converted in an aspect to a digital image. Metadata associated with the digital image is preferably created/captured with the digital image and in an embodiment can include resolution, size, blob (bytes), format, tags, date, device type, etc. The digital converter can take any form, for example, a camera, scanner, OpenCV, or other technologies. The digitally converted sketch is identified at 915 using a symbol matching module, e.g., Symbol Matching Module 475 in Symbol Engine Module 470. In one or more embodiments, the digital image is compared to defined symbols in the symbol database 477. Defining the symbols and storing the defined symbols in Symbol Database 477 is explained in method 1000 in FIG. 10.

If at 920 a match for the digitally converted sketch (the digital image) is found for example in the symbol database (920: Yes), e.g., the digital image is recognized in 915, then process 900 continues to 930. If at 920 a match for the digital image is not found (920: No), then the digital image at 925 is feed into the Symbol Engine to enhance the machine learning. That is, in an aspect, the symbol that the user/deployer has drawn is registered in the symbol database. After 925 the process 900 continues to 905 where the hand-sketch and written cloud resource representation is reintroduced to 910 and is reprocessed through 920 where again it is determined whether there is a match between the digital image and defined symbols in the symbols database, e.g., the Symbols Database 477. In an example, the diagram is resketched and reefed into the system/process.

If at 920 there is a match between the digitally converted sketch (the digital image) and a defined symbol in the symbol matching module, e.g., Symbol Matching Module 475, and more specifically in the Symbol Database 477, a structured digital representation (a digital structured diagram) with metadata is produced at 930. In an aspect, at 930 the identified digitally converted sketch (the digital image) is converted into a digital structured representation or diagram with metadata. The metadata is a collection of properties and/or details that is assigned to the object, in this case the digital structured diagram (representation). That is, when there is a match between a defined symbol in the symbol database and the digital image, the system in an embodiment uses the definitions and information for the stored defined symbol to create a digital structured representation. The system in an embodiment, can switch the defined symbol (with the defined/saved metadata) for the digital image. In one or more embodiments, converting the digital image includes creating the cloud deployment representation, including generating the cloud deployment manifest and configuration files as described in 815 in flowchart 800. The activities and operations at 930 are further described in connection with 815 and 820 in FIG. 8. At 935 the metadata, e.g., the properties/details of a specific cloud resource about to be deployed, is stored. In an aspect the metadata includes or consists of state information and the state information is stored at 935. The state information includes the current state/status and desired state/status of the deployment, and can include what the deployment will look like in the cloud environment. In an aspect, the activities and operations at 935 are encompassed by part of the operations in 820 of FIG. 8. The cloud provider API, e.g., Cloud Resources Management Interface 510, is used at 940 to provision, allocate, and/or deploy the cloud computing resources.

FIG. 10 is an exemplary flowchart in accordance with another embodiment illustrating and describing a method 1000 of defining open-source symbols, diagrams, and topology for use in the system and/or techniques for provisioning cloud computing resources using free hand sketches, drawings, or diagrams. While the method 1000 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 10, but the process may be integrated and/or one or more steps may be performed together, simultaneously, or the steps may be performed in the order disclosed or in an alternate order.

At 1005 of process 1000, hand sketches of different variations of cloud resource symbol representations and specifications are provided. For example, a hand sketch of database 34, or virtual machine 35 is created. At 1010 a structured diagram that corresponds to the hand sketch representations is drawn using a digital interface. That is, a digitized structured representation of the hand drawn sketch is created. The digitized structured diagram is a more defined drawing that corresponds to the hand drawn sketch from 1005. The digital interface in this instance for example refers to a computer laptop, desktop, tablet, etc. The operator who drew the hand sketch in 1005, or other operator, will also draw a more defined diagram using a digital interface at 1010. As part of the symbol defining process, 1010 is typically performed as a manual input step, whereas 810 is performed automatically.

Cloud configuration input templating is performed at 1015 where different specifications are computed for the different (digital or digitized) structured diagrams. That is, at 1015 the specifications including the name, sizing, associated cloud resources and details are correlated to the respective structured diagram. Cloud computing provider resource specifications are also provided and associated with the respective structured diagram. At 1020 the hand sketches are associated and correlated with the structured diagrams and specifications, preferably by a symbol matching module, e.g., Symbol Matching Module 475. At 1020, the structured diagrams (the digital representation and specifications of the hand sketch) are compared to existing defined symbols and/or logos for computing resources. For example, the structured diagram is compared to the symbols in for example the symbol database 477, and if a match is found the hand sketch is correlated with the structured diagram so when deploying the cloud resources the hand drawn sketch can be converted to the corresponding structured diagram.

At 1025 it is determined if the exiting symbol is found in the system's preexisting defined symbols. That is, at 1025 it is determined if the digital structure representation and specifications, e.g., the structure diagram, matches with any existing defined symbols and/or logos, for example stored in the Symbol Database 477. If at 1025 there is no existing defined symbol/logo for the digitized structure representation and specifications, e.g., the structure diagram (1025: No), then the process 1000 continues to 1030 where the new symbol/structure diagram, e.g., the digitized representation and specifications, is stored. In an example, the new symbol/logo/structure diagram is stored in the Symbol Database 477.

If on the other hand, at 1025 the structured, digitized representation (the structured diagram) matches existing defined resources in the system (1025: Yes), then the process 1000 continues to 1035 where different cloud computing resource symbol representations are hand sketched, as advised by the system in an embodiment. After 1035 the process 1000 would continue back to 1005 where a different hand drawn sketch is introduced to the system and the process continues where the digital interface draws a structural, digitized representation of the different hand sketch and the process continues to 1015, etc. until sufficient or all structures are defined. The process 1000 can be invoked as the system and process is used to provision cloud computing resources to expand the symbols, and representations that the system will recognize.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment and terminology was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of provisioning cloud computing resources comprising:
    converting a hand sketch representation of cloud computing resources to a digital image with metadata;
    generating a cloud deployment representation from the digital image with metadata including determining whether the digital image matches a defined symbol in a symbol database and generating, in response to the digital image matching the defined symbol in the symbol database, the cloud deployment representation based upon the matching defined symbol;
    preparing cloud deployment manifest and configuration files from the cloud deployment representation;
    converting the cloud deployment manifest and configuration files into input data to be used to provision cloud computing resources; and
    transmitting the input data to a cloud computing vendor to provision the cloud computing resources.

2. The computer-implemented method according to claim 1, further comprising storing the cloud deployment manifest files.

3. The computer-implemented method according to claim 1, wherein generating the cloud deployment representation comprises generating a digital structured diagram.

4. The computer-implemented method according to claim 3, wherein the digital structured diagram comprises cloud deployment topology.

5. The computer-implemented method according to claim 1, wherein preparing the cloud deployment manifest files and configuration files comprises using cloud deployment manifest files and configuration files corresponding to the matching defined symbol.

6. The computer-implemented method according to claim 1, further comprising, in response to the digital image not matching a defined symbol in the symbol database, revise the hand sketch using machine learning.

7. A computer-implemented method according to claim 1, further comprising using the cloud provider API to provision the cloud computing resources.

8. The computer-implemented method according to claim 1, further comprising associating hand sketches and specifications of cloud computing resources with symbols in the symbol database to create defined symbols.

9. A non-transitory computer readable medium comprising instructions that, when executed by at least one hardware processor, configure the at least one hardware processor to:
 convert a hand sketch representation of cloud computing resources to a digital image with metadata;
 generate a cloud deployment representation from the digital image with metadata including determining whether the digital image matches a defined symbol in a symbol database and generating, in response to the digital image matching a defined symbol in the symbol database, the cloud deployment representation based upon the matching defined symbol in the symbol database;
 prepare cloud deployment manifest and configuration files from the cloud deployment representation;
 convert the cloud deployment manifest and configuration files into input data to be used to provision cloud computing resources; and
 transmit the input data to a cloud computing vendor to provision the cloud computing resources.

10. The non-transitory computer readable medium according to claim 9, wherein preparing the cloud deployment manifest files and configuration files further comprises instructions that, when executed by at least one hardware processor, configure the at least one hardware processor to use cloud deployment manifest files and configuration files corresponding to the matching defined symbol.

11. The non-transitory computer readable medium according to claim 9, further comprising instructions that, when executed by at least one hardware processor, configure the at least one hardware processor to associate hand sketches and specifications of cloud computing resources with symbols in the symbol database to create defined symbols.

12. A computer-implemented system to provision cloud computing resources comprising:
 a memory storage device storing program instructions; and
 a hardware processor having circuitry and logic to execute said program instructions to provision the cloud computing resources, the hardware processor coupled to said memory storage device and in response to executing said program instructions, is configured to:
 convert a hand sketch representation of cloud computing resources to a digital image with metadata;
 generate a cloud deployment representation from the digital image with metadata including determining whether the digital image matches a defined symbol in a symbol database and generating, in response to the digital image matching a defined symbol in the symbol database, the cloud deployment representation based upon the matching defined symbol in the symbol database;
 prepare cloud deployment manifest and configuration files from the cloud deployment representation;
 convert the cloud deployment manifest and configuration files into input data to be used to provision cloud computing resources; and
 transmit the input data to a cloud computing vendor to provision the cloud computing resources.

13. The computer-implemented system according to claim 12, wherein the hardware processor is further configured to use cloud deployment manifest files and configuration files corresponding to the matching defined symbol.

14. The computer-implemented system according to claim 12, wherein the hardware processor is further configured to associate hand sketches and specifications of cloud computing resources with symbols in the symbol database to create defined symbols.

* * * * *